(12) United States Patent
Prawda et al.

(10) Patent No.: US 10,293,846 B2
(45) Date of Patent: May 21, 2019

(54) LOCKING DEVICE FOR AN ADJUSTABLE STEERING COLUMN FOR A MOTOR VEHICLE

(71) Applicants: THYSSENKRUPP PRESTA AG, Eschen (DE); thyssenkrupp AG, Essen (DE)

(72) Inventors: Martin Prawda, Tokyo (JP); Daniel Shearer, Rodels (CH)

(73) Assignees: THYSSENKRUPP PRESTA AG, Eschen (DE); THYSSENKRUPP AG, Essen (DE)

( * ) Notice: Subject to any disclaimer, the term of this patent is extended or adjusted under 35 U.S.C. 154(b) by 46 days.

(21) Appl. No.: 15/554,030

(22) PCT Filed: Feb. 2, 2016

(86) PCT No.: PCT/EP2016/052125
§ 371 (c)(1),
(2) Date: Aug. 28, 2017

(87) PCT Pub. No.: WO2016/134927
PCT Pub. Date: Sep. 1, 2016

(65) Prior Publication Data
US 2018/0037249 A1 Feb. 8, 2018

(30) Foreign Application Priority Data
Feb. 27, 2015 (DE) .................. 10 2015 203 541

(51) Int. Cl.
*B62D 1/184* (2006.01)
*F16F 7/06* (2006.01)
*B62D 1/189* (2006.01)

(52) U.S. Cl.
CPC ............. *B62D 1/184* (2013.01); *B62D 1/189* (2013.01); *F16F 7/06* (2013.01)

(58) Field of Classification Search
CPC ................................. B62D 1/184; B62D 1/189
See application file for complete search history.

(56) References Cited

U.S. PATENT DOCUMENTS

| 6,173,822 B1 * | 1/2001 | Korb | F16F 9/145 |
| | | | 188/293 |
| 6,237,438 B1 * | 5/2001 | Ben Rhouma | B62D 1/184 |
| | | | 74/492 |

(Continued)

FOREIGN PATENT DOCUMENTS

| CN | 203836021 U | 9/2014 |
| DE | 4400306 A | 7/1994 |

(Continued)

OTHER PUBLICATIONS

English Translation of International Search Report issued in PCT/EP2016/052125, dated Apr. 14, 2016 (dated Apr. 22, 2016).

(Continued)

*Primary Examiner* — Nicole T Verley
(74) *Attorney, Agent, or Firm* — thyssenkrupp North America, Inc.

(57) ABSTRACT

A locking device for an adjustable steering column for a motor vehicle may include an actuating shaft that is mounted such that it can be rotated about a rotational axis, that is connected to an operative element of a clamping device, and that is coupled to a rotor of a rotational damper. The rotor may be mounted rotatably in a housing and may be capable of being driven rotationally about a rotor axis by the actuating shaft. A rotational movement of the rotor may be damped in at least one rotational direction. The rotor may have at least one blade that projects radially with regard to the rotor axis and that has a contact face that makes frictional contact with a contact track on an inner face of the housing. Such a locking device has an improved rotational damper, is (Continued)

less complicated to manufacture, and has high acceptance in automotive engineering.

12 Claims, 3 Drawing Sheets

(56) References Cited

U.S. PATENT DOCUMENTS

| | | | | |
|---|---|---|---|---|
| 7,631,898 | B2* | 12/2009 | Bechtel | B62D 1/184 280/775 |
| 9,150,240 | B2* | 10/2015 | Schnitzer | F16F 7/06 |
| 9,193,376 | B2* | 11/2015 | Cron | B62D 1/184 |
| 2014/0318305 | A1 | 10/2014 | Cron | |
| 2015/0053041 | A1 | 2/2015 | Schnitzer | |
| 2015/0360712 | A1* | 12/2015 | Baumeister | B62D 1/184 403/53 |
| 2018/0170419 | A1* | 6/2018 | Blattler | B62D 1/184 |

FOREIGN PATENT DOCUMENTS

| | | |
|---|---|---|
| DE | 19615208 A | 10/1996 |
| DE | 19745038 A | 7/1999 |
| DE | 102012100486 B | 2/2013 |
| DE | 102011055410 A | 5/2013 |
| JP | 2012092886 A | 5/2012 |
| WO | 2013107486 A | 7/2013 |

OTHER PUBLICATIONS

English abstract for DE4400306A.
English abstract for DE19615208A.

\* cited by examiner

LOCKING DEVICE FOR AN ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2016/052125, filed Feb. 2, 2016, which claims priority to German Patent Application No. DE 10 2015 203 541.7 filed Feb. 27, 2015, the entire contents of both of which are incorporated herein by reference.

FIELD

The present disclosure generally relates to locking devices and, more particularly, to locking devices for steering columns of motor vehicles.

BACKGROUND

Adjustable steering columns are known in the prior art, in the case of which adjustable steering columns a casing unit of a steering column, in which the steering spindle of a steering shaft is mounted rotatably, can be locked releasably between the two side cheeks of a bracket part which is attached fixedly to the vehicle body. The locking takes place by the side cheeks being moved against one another by way of the actuation of a locking or clamping device, with the result that substantially non-positive clamping of the casing unit takes place. If the locking device is released, the position of the casing unit and therefore of the steering wheel which is attached at the rear end of the steering shaft can be adjusted relative to the position of the driver.

In known locking devices, the actuation for locking and releasing takes place by way of rotation of an actuating shaft via an actuating lever which is attached thereto. A locking device of this type is described, for example, in DE 10 2011 055 410 A1, in which a first cam carrier is arranged fixedly on a side cheek so as to rotate with it, and a second cam carrier with cams which are directed counter to the first cam carrier is attached on the actuating shaft. The cam carriers are lifted up from one another by way of a rotation of the actuating shaft out of an angular position, in which the cams of the one cam carrier engage between the cams of the other cam carrier, into a relative angular position, in which the cam tips bear against one another. Said lift can be utilized to press said side cheeks of the bracket part against one another by way of support against an axial abutment of the actuating shaft, which axial abutment is arranged on the bracket part. As an alternative, other mechanisms can also be used which permit a conversion of the rotational movement of the actuating shaft into translational bracing of the side arms, for example wedge plate/cam systems or gravity lock clamping systems, as known from DE 44 00 306 A1, or the like.

By virtue of the fact that the parts which can be moved against one another for bracing purposes, for example the cam carriers, have mechanical play in the known clamping systems, the actuating lever can vibrate and generate undesired rattling noise. Moreover, a restoring force acts on the actuating lever during the release of the clamping action, which restoring force can lead to likewise undesired snapping back of the actuating lever. In DE 10 2011 055 410 A1, both undesired effects are counteracted by the actuating shaft being connected to a damping device which damps a rotation of the actuating shaft about its rotational axis in at least one rotational direction. As a result, vibrations and noise are reduced, and the result is an equalized, braked movement of the actuating lever.

In order to realize the damping device, DE 10 2011 055 410 A1 proposes the use of a rotary or rotational damper with a rotor which, during a rotation about its rotor axis, has mechanical rotational energy removed from it, that is to say is braked or damped. To this end, the rotor is mounted in a housing such that it can be rotated about its rotor axis, which housing is filled with a highly viscous damping fluid which is displaced during a rotation of the rotor and in the process brakes the rotational movement of the rotor by way of internal friction and interface friction.

The defined and reliable function is advantageous in the case of the known rotational damper. The relatively complicated design is disadvantageous, however, in the case of which design the housing and the rotor shaft have to be sealed against the liquid fluid. Moreover, the use of liquids in the vehicle interior is fundamentally to be avoided as far as possible.

Thus a need exits for a locking device with an improved rotational damper which is less complicated to manufacture and has a high acceptance in automotive engineering.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns locking devices for adjustable steering columns of motor vehicles. In some examples, a locking device may have an actuating shaft that is mounted such that the actuating shaft can be rotated about a rotational axis, that is connected to an operative element of a clamping device, and that is coupled to a rotor of a rotational damper. The rotor may be mounted rotatably in a housing and may be capable of being driven rotationally about a rotor axis by means of the actuating shaft. A rotational movement of the rotor may be damped in at least one rotational direction.

In some examples, a rotational damper may be configured as a dry rotational damper, and the rotor may have at least one blade that projects radially with regard to the rotor axis and on which a contact face is configured that makes frictional contact with a contact track on an inner face of the housing, the damping action being defined by the dry friction of the contact face on the contact track.

According to the invention, a rotational damper is used in a locking device of the generic type for braking and homogenizing the movement of the actuating lever, in the case of which rotational damper the rotational movement of the rotor is braked within the housing. As a result, it advantageously remains ensured, as in the prior art, that the rotor is accommodated in a manner which is protected against environmental influences. In contrast to the prior art, however, the use of a liquid damping fluid is not required; no liquid is namely used for damping in principle. As a re-suit, there are firstly no costs and acceptance problems brought about by the liquid fluid, and secondly the complexity for construction and manufacture of a dry rotational damper according to the invention is considerably lower than in the prior art, because of the omission of sealing measures alone.

In detail, the functional principle of the rotational damper according to the invention is based on the fact that there is a braking moment which acts on the rotor by way of interface friction of at least one contact or friction face which is configured at a radial spacing from the rotor axis on a blade, or in other words a rotor arm, of the rotor and bears against a circulating contact track on the inner side of the housing. The contact track extends continuously over the entire inner circumference of the housing. A rotation of the rotor about the rotor axis leads to said contact face sliding dryly along the contact track in an uninterrupted manner, rotational energy being converted into heat by way of the interface friction between the surfaces of the contact face and the contact track which bear dryly against one another, and braking of the rotor taking place as a result. Effective damping of the rotational movement of the actuating shaft can be realized by virtue of the fact that the actuating shaft of the clamping device is coupled in a torque-transmitting manner to the rotor shaft in a manner known per se, for example by way of non-positive attachment on the actuating shaft or gearwheels being connected in between.

According to the invention, during a rotation of the rotor about the rotor axis, the blades are in dry rubbing contact by way of their contact faces in an uninterrupted manner with the circulating contact track on the inner side of the housing. It is essential for the invention here that the housing does not contain any liquid, that is to say is completely free of liquid damping fluid. This ensures that no use of liquids takes place in the vehicle interior. It is ensured, moreover, that the frictional force which is stipulated according to the invention and is stipulated by the exclusively dry friction of the contact faces on the contact track is impaired by liquid. As a result, the damping action is defined exclusively by way of mechanical, dry friction of the contact faces on the contact track.

The braking moment which is exerted as a damping action on the rotor as a result of the friction of the contact face on the contact track is substantially dependent on the size of the contact face, the surface structure and the materials of the contact face and the contact track, and on the relative surface pressure, that is to say the force per unit area which is exerted via the contact face on the contact track. It is possible by way of targeted variation of said parameters to individually set a damping action within broad limits with low complexity.

A plurality of blades are preferably arranged distributed uniformly over the circumference of the rotor. A star-shaped arrangement is formed as a result, in the case of which the blades are fastened to the rotor axis in a similar manner to the spokes of a rim and slide rubbingly along an inner face of the housing by way of the contact faces which are configured at a spacing from the rotor axis. It is advantageous here that the housing encloses the rotor in an at least approximately dust-tight manner, with the result that the penetration of contaminants between the contact face and the contact track is prevented or at least made more difficult. A closed configuration of this type of the housing can be brought about in every case with lower complexity than the permanently fluid-tight configuration which is required in the prior art.

One practical embodiment of the invention can take place in a particularly efficient manner by virtue of the fact that the rotor and/or the housing are/is configured as plastic injection molded parts. Plastic parts of this type can be manufactured inexpensively with high precision in great quantities, it being possible for an optimized adaptation to the required friction properties to take place by way of a large freedom of design of the shape of the rotor and the housing and the selection of the plastics which are used.

One advantageous embodiment of the invention provides that the contact track is configured on an inner circumferential face which surrounds the rotor and has a substantially cylindrical basic shape which is coaxial with respect to the rotor axis. Substantially cylindrical is understood to mean cross-sectional changes of ±25% with respect to a nominal mean cross-sectional dimension, for example a mean diameter. In this embodiment, the contact face or contact faces is/are configured on the blade/blades on an outer circumferential face of the rotor which likewise has a substantially cylindrical basic shape which is coaxial with respect to the rotor axis, with the result that each contact face bears against the contact track radially from the inside. In this embodiment, a configuration is formed which is similar to a drum brake. Here, the housing acts as a brake drum with an inner cylindrically circulating friction or brake face (the contact track), one or more contact faces being arranged at the outer radial end of the blades, which contact faces, like the brake shoes of a drum brake, are pressed in the radial direction from the inside against the contact track of the housing which forms the brake drum. Using this analogy, it can also readily be seen that the braking action is dependent on the contact pressure of the contact faces on the contact track. Moreover, the known advantages can also be realized, such as reliable function and long-term low-maintenance operation.

One advantageous embodiment of the invention provides that the contact track is configured on an inner circumferential face which surrounds the rotor and has a conical basic shape which is coaxial with respect to the rotor axis. A corresponding conical basic shape can also be called conical or frustoconical and in the process has a first diameter and a second diameter which is spaced apart axially from the former, the first and the second diameter delimiting the inner circumferential face in the rotor axis direction, and the first diameter being greater or smaller than the second diameter.

In this embodiment, the contact face or contact faces is/are configured on the blade/blades on an outer circumferential face of the rotor which likewise has a conical basic shape which is coaxial with respect to the rotor axis, with the result that every contact face bears against the contact track radially from the inside. In this embodiment, a configuration is formed which is similar to a conical drum brake. Here, the housing acts as a brake drum with an inner conically (also called tapered) circulating friction or brake face (the contact track), one or more contact faces being arranged at the outer radial end of the blades, which contact faces, like the brake shoes of a drum brake, are pressed in the radial direction from the inside against the contact track of the housing which forms the brake drum. The value of the cone angle which corresponds to twice half the opening angle is particularly preferably between 2° and 20°, very particularly preferably between 5° and 10°.

In one advantageous development, at least one blade has a wall thickness which changes in the direction of the rotor axis. Here, the wall thickness is considered orthogonally with respect to the rotor axis and therefore describes the thickness of the blade. By way of said changing wall thickness, the braking action can be adapted in a targeted manner to the existing requirements. The design becomes free in this way.

It is particularly advantageous that the blade comprises at least one spring element which prestresses the contact face against the contact track. The spring element exerts a spring force on the contact face, by way of which spring force said contact face is pressed against the contact track, with the result that a defined surface pressure and therefore a frictional force can be stipulated with consideration of the size of the contact face, as a result of which in turn the damping action can be stipulated. In the above-described embodiment with the drum-like housing, the spring force acts radially to the outside, as viewed from the rotor axis, and presses the contact face which is arranged at the radially outer end of the respective blade against the contact track radially from the inside. The stipulation of the spring constant of the spring element and the radial compression, that is to say the travel, by which the spring element has to be compressed in the radial direction out of the unloaded state during insertion of the rotor into the housing, results in the force, with which the respective contact face is pressed radially against the contact track. As a result, the braking or damping action of the rotational damper can be stipulated.

In one preferred embodiment, the blade is configured as a leaf spring in the region between the rotor axis and the contact face, which leaf spring extends at least in sections in an inclined manner relative to the radial direction in a first circumferential direction. Here, a leaf spring is understood to mean an elongate spring element which can be subjected to a bending load elastically transversely with respect to its longitudinal extent. In accordance with the embodiment, the leaf spring has at least one part region which intersects a radius which emanates from the rotor axis at a spacing from the rotor axis at an angle of inclination of less than 180°. In other words, the said part section lies, with regard to a coaxial circumference of the rotor, on a secant which is angled away with respect to the first circumferential or rotational direction with regard to a diameter of the rotor. In its radial end region, the contact face is attached on the leaf spring, which contact face runs in the circumferential direction, that is to say tangentially, with regard to the circumference of the rotor which coincides with the conical (also called tapered) contact track on the inner side of the housing. As a consequence, the radial outer end of the leaf spring encloses an acute angle of less than 90° in the direction of the abovementioned angle of inclination with the tangential contact face or the tangent which bears against the contact track there.

The above-described inclined arrangement of the leaf spring results firstly in it being possible for a radially outwardly directed spring force to be exerted on the contact face by way of bending loading of the leaf spring if the leaf spring has a sufficiently dimensioned length. Secondly, a friction force which occurs during a rotation in the first circumferential or rotational direction on account of the friction between the contact face and the contact track and acts counter to the first circumferential direction exerts a radial force component on the leaf spring on account of the above-described oblique arrangement. This radial force component is added to the radial component of the spring force which prevails in the rest state, with the result that an increase in the radial force occurs in effect, by way of which radial force the contact face is pressed against the contact track. Accordingly, higher friction and therefore a higher braking or damping moment are produced. The braking moment is therefore speed-dependent, with the result that an effective damping action is achieved.

If, in contrast, the rotor is rotated in a second or reverse rotational direction counter to the first rotational direction, the radial force component which is exerted on the contact face as a result of the friction acts in the opposite direction, and the spring force which effectively acts on the contact face against the contact track is reduced correspondingly. As a result, the braking or damping moment in the reverse rotational direction is lower than in the rotational direction, with the result that freewheeling is effectively realized in the reverse rotational direction. In other words, the damping of the actuating shaft which is coupled to the rotor takes place in a preferential rotational direction.

In practice, the movement of the actuating shaft is to be damped to a more pronounced extent if the actuating lever is moved from the locked position into the released position of the actuating shaft, that is to say, when the locking device is released in order to adjust the steering wheel position, the actuating lever is moved in the abovementioned rotational direction, and is correspondingly moved in the reverse rotational direction during locking.

The contact face can be attached at the outer end in a manner which is angled away arcuately in a first circumferential direction relative to the radial extent of the blade. This achieves a situation where the inclination of the blade is compensated for and the contact face bears radially against the contact track.

The above-described inclination of the leaf spring can be realized by way of an angled-away course. As an alternative, it is possible that the blade is configured in the form of an arc which is open toward the first circumferential direction. This is an arcuate leaf spring which in principle can be considered to be a sequence of sections which are inclined counter to the radial direction. By way of compression of the ends of the arc, a resilient radial force can be exerted on the contact face which is attached at the outer end, which radial force, as explained above, is increased during rotation in the first rotational direction and is reduced during opposed rotation in the reverse rotational direction. The arcuate configuration ensures uniform flexural loading over the radial extent of the leaf spring, as a result of which the long-term durability is improved.

One configuration of the blade or blades as a leaf spring can be carried out particularly satisfactorily as a plastic injection molded part, the above-described arcuate shape utilizing the material properties particularly satisfactorily. It is conceivable and possible, furthermore, to configure the blades at least partially from an elastomer. For example, at least one bump for configuring the contact face can be arranged on the blade, said bump interacting with the contact track. A bump is to be understood to mean a projection which corresponds substantially to a hemisphere. An even more improved braking action can be achieved as a result.

Furthermore, it is advantageous that the contact face is of arcuate configuration in cross section, the arc being open toward the rotor axis and having a smaller bending radius than the contact track. This realizes a narrow contact face which extends substantially parallel to the rotor axis and can bear securely against the arcuate contact track. Moreover, the curved arcuate shape can slide satisfactorily along the contact track in the rotational and reverse rotational direction, without catching or tilting. Substantially parallel to the rotor axis is understood to mean a deviation of ±15°.

It is conceivable and possible, furthermore, that radially inwardly projecting structural elements are configured on the contact track. Here, for example, the contact track can be configured as a slotted guide face which is provided with projections and/or depressions, on which the contact face slides along during a rotation of the rotor. A latching position, for example, can be defined by way of the projections or depressions, which latching position influences the braking properties or else is perceived haptically to be pleasant. Resilient blades can dip into depressions in the unloaded rest state, with the result that the radial prestress is reduced, which counteracts permanent settling of the spring, in particular in the case of plastic spring elements, and increases the service life as a result.

The rotor can be attached fixedly on the actuating shaft so as to rotate with it. In this case, the damping of the rotor takes place directly via the rotary angle of the actuating lever between the locked and released position of the actuating shaft; in practice, this is a value between 35° and 55°, preferably approximately 45°. As an alternative, it is conceivable and possible that a second gearwheel is attached fixedly on the rotor so as to rotate with it, which second gearwheel is in engagement with a first gearwheel, it being possible for the second gearwheel to be driven rotationally relative to the first gearwheel by means of the actuating shaft. A transmission ratio can be effected in this way, with the result that, in the case of pivoting of the actuating lever, for example by 45°, the rotor is rotated by from 160° to 180°. As a result of the transmission ratio, the braking moment and therefore the damping action of the rotational damper are boosted accordingly.

Figure 1:
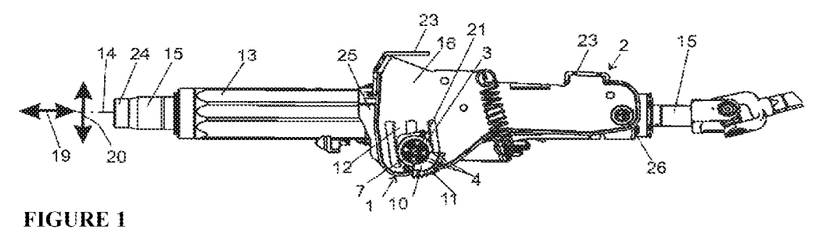
FIG. 1 is a side view of an example steering column, with a removed actuating lever.

FIG. 1 shows a locking device 1 according to the invention on a steering column 2 in a side view.

The steering column 2 has a bracket part 16 which can be fastened by means of fastening lugs 23 to a body (not shown here) of a motor vehicle. A box section swingarm 25 (also called an outer casing unit 25) is arranged on the bracket part 16 via the pivoting joint 26. A vertical adjustment in the vertical adjustment direction 20 can be achieved by way of pivoting of the box section swingarm 25 relative to the bracket part 16 about the pivoting joint 26. The casing unit 13 is mounted in the box section swingarm 25. Said casing unit 13 can be displaced along the longitudinal axis 14 of a steering spindle 15 (that is to say, in the longitudinal adjustment directions 19) relative to the box section swingarm 25 and therefore to the bracket part 16. In the exemplary embodiment which is shown, both vertical and longitudinal adjustment of a steering wheel (not shown here) is therefore possible, which steering wheel can be mounted in the present illustration on the steering wheel connector 24 of the steering spindle 15. Apart from the crash case, an adjustment possibility exists in normal operation only, however, when the locking device 1 is situated in its open position or released position. If the locking device 1 is situated in its closed position or locked position, the position of the casing unit 13 relative to the bracket part 16 and therefore relative to the body of the vehicle is fixed. The steering spindle 15 is mounted in the casing unit 13 such that it can be rotated about its longitudinal axis 14. In its closed position, the locking device 1 can ensure corresponding fixing of the casing unit 13 relative to the bracket part 16 by means of a positively locking connection and/or else by means of a frictionally locking connection or non-positive connection. Corresponding positively locking and/or non-positive clamping systems are known in the prior art.

Figure 2:
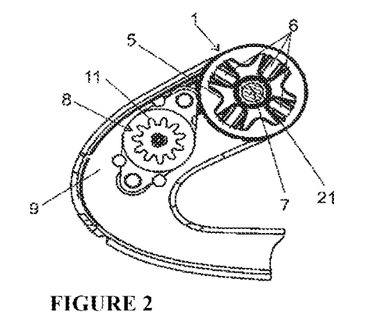
FIG. 2 is a partial view of an example actuating lever.
Figure 3:
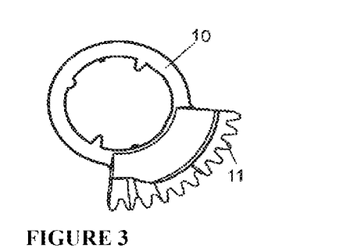
FIG. 3 is an axial view of an example gearwheel of FIG. 1.
Figure 4:
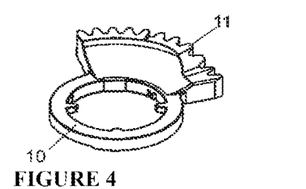
FIG. 4 is a perspective view of the gearwheel of FIG. 4.

The locking device 1 which is shown here has an actuating shaft 21 which is known per se and can be seen here in cross section. Said actuating shaft 21 is guided through the opposite side cheeks 12 of the bracket part 16 in the direction perpendicularly with respect to the plane of the drawing according to FIG. 1, and is held on the bracket part 16 by means of a nut or the like on an opposite side (not visible here) of the bracket part 16. The first cam carrier 3 with its cams 4 is arranged on the actuating shaft 21 on the visible side. The second cam carrier 5 including its cams 6 and the actuating lever 9 is removed in FIG. 1 and is shown separately in FIG. 2. In the finally assembled position, the two said cam carriers 3 and 5 are arranged on the actuating shaft 21 in such a way that they can be rotated relative to one another about the rotational axis 7, and the cams 4 of the first cam carrier 3 interact with the cam or cams 6 of the further cam carrier 4 so as to slide along one another in the case of a rotation of the cam carriers 3 and 5 relative to one another about the rotational axis 7. On account of the fixed fastening of the cams 4 and 6 on the respective cam carrier 3 and 5, this is exclusively a sliding movement for the case where the cams of the two cam carriers 3 and 5 which can be rotated with respect to one another are in contact. Rolling or the like therefore does not occur. In the exemplary embodiment which is shown, the first cam carrier 3 is held fixedly on a side cheek 12 so as to rotate with it, which side cheek 12 is stationary with regard to the steering column 2 or the bracket part 16. In contrast, the second or further cam carrier 5 is attached fixedly on the actuating lever 9 so as to rotate with it. As a consequence, during pivoting of the actuating lever 9 about the rotational axis 7 which is arranged coaxially with respect to the actuating shaft 21, the cam carriers 3 and 5 are rotated relative to one another about said rotational axis 7. A stroke in the longitudinal direction of the rotational axis 7 occurs as a result of the corresponding interaction of their cams 4 and 6, as a result of which tensioning or closing or relieving or opening of the locking device 1 occurs depending on the stroke direction, as is known per se. In specific terms, the two side cheeks 12 which lie opposite one another are moved against one another during tensioning or closing, as is indicated in the exploded illustration of FIG. 12 by way of the two opposed arrows, with the result that the casing unit 13 or the box section swingarm 25 which is situated between the side cheeks 12 is clamped fixedly in position on the bracket part 16. In the released position of the locking device 1, the side cheeks 12 are relieved, that is to say are released counter to the arrow direction, and the adjustment possibilities which have already been mentioned at the outset are available.

Instead of the cam carriers 3 and 4, alternative locking devices (as described, for example, in DE 44 00 306 A1) have, for example, a gravity lock mechanism or the like which likewise converts a rotation of an actuating shaft 21 into a clamping movement.

In order to homogenize the movement of the locking device 1, said locking device 1 comprises according to the invention a rotational damper 8 which is fastened to the actuating lever 9 in the exemplary embodiment which is shown. In the exemplary embodiment which is shown, the actuating device 10 which interacts with the rotational damper 8 is configured as a gearwheel 10 which is fastened fixedly to the side cheek 12 and therefore to the bracket part 16 so as to rotate with them.

The construction of the rotational damper 8 will be described in greater detail in the following text using FIGS. 5, 6, 7 and 8. According to said figures, the rotational damper 8 has a housing 81 which can be fixed on fastening lugs 82 on the actuating lever 9.

Figure 5:
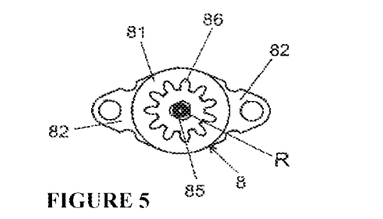
FIG. 5 is a front view of a rotational damper in an axial direction of a rotor axis.
Figure 6:
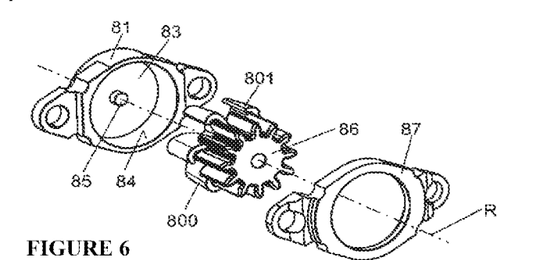
FIG. 6 is an exploded perspective view of the rotational damper of FIG. 5.

The housing 81 has a conical interior 83 with an inner circumferential face 84 which surrounds a rotor axis R in a casing-shaped manner. The conical interior 83 is distinguished by the fact that the diameter of the inner circumferential face is greater on the side which faces the cover 87 than the diameter on the side which faces away from the cover 87. A rotor 800 is mounted in the interior 83 such that it can be rotated about the rotor axis R, to be precise on an axle journal 85. A second gearwheel 86 is coaxially attached fixedly on the rotor 800 so as to rotate with it. Said second gearwheel 86 projects axially to the outside out of the housing 81 through a cover 87. In the mounted state, said cover 87 holds the rotor 800 in the axial direction (in the direction of the rotor axis R) in the interior 83 of the housing. It is essential that the interior 83 is free from liquid, that is to say is not filled with liquid damping fluid.

The second gearwheel 86 is in engagement with the first gearwheel 10. If the actuating lever 9 is then pivoted in order to release or lock the locking device 1, the rotor axis R of the rotational damper 8 moves about the rotational axis 7, the second gearwheel 86 meshing with the toothing system 11 of the first gearwheel 10 which is stationary relative to said movement of the rotational damper 8. As a consequence, the second gearwheel 86 is driven rotationally about the rotor axis R, as a result of which the rotor 800 likewise rotates in the interior 83 of the housing 81 about the rotor axis R.

Figure 7:
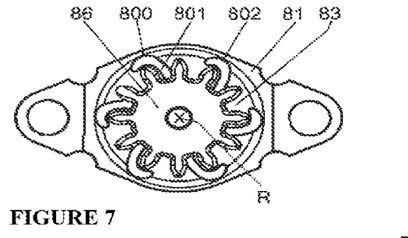
FIG. 7 is a front view of the rotational damper in the axial direction of the rotor axis of FIG. 5 with a removed housing cover.

FIG. 7 shows a view in the direction of the rotor axis R as in FIG. 5, the cover 87 being omitted and it being possible for the arrangement of the rotor 800 to be recognized which is covered partially by the second gearwheel 86.

Figure 8:
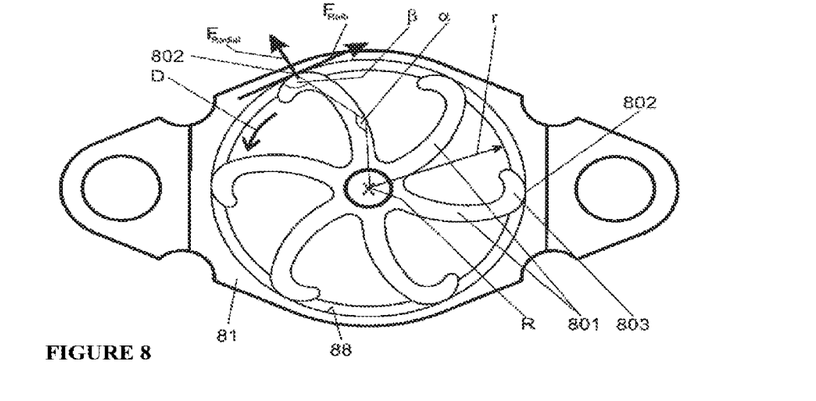
FIG. 8 is a diagrammatic enlarged view of the rotor with a removed gearwheel as in FIG. 7.

FIG. 8 shows a diagrammatic view which is similar to FIG. 7, the second gearwheel 86 also having been omitted for improved recognizability of details of the rotor 800.

In the embodiment which is shown, the rotor 800 has a total of six blades 801 which are distributed uniformly over the circumference and project radially from the rotor axis R in a star-shaped manner. As can be gathered from the perspective illustration of FIG. 6, the blades 801 are formed as flat strips, approximately in a leaf-shaped manner, which extend in a rectilinear manner axially in the direction of the rotor axis R and extend arcuately in the radial direction. The arcuate extent can be recognized using an illustrated radius r: The course of the blade 801 is angled away by an angle $\alpha$ with respect to the radius r in a rotational direction D which is indicated by way of a curved arrow, $\alpha$ being less than 180°.

The blades 801 are dimensioned in the radial direction in such a way that they bear in a spring-loaded manner in each case by way of a contact face 802 from the inside against the inner circumferential face 84 of the housing 81. The contact faces 802 are configured on the outside with regard to the rotor axis R on end regions of the blades 801 which are likewise angled away in the rotational direction D, to be precise by an angle $\beta$, $\beta$ being greater than 90°, with the result that each contact face 802 bears against the inner circumferential face 84 in a manner which is directed radially outward. As a result, in the case of a rotation of the rotor 800, the contact faces 802 slide or grind along on a circumferential surface region of the inner circumferential face 84 in an uninterrupted manner, said surface region which is swept over by the contact faces forming what is known as the contact track 88, the width of which in the direction of the rotor axis R coincides with the width of the contact faces 802 on the blades 801. By virtue of the fact that the interior 83 is free from liquid, that is to say is not filled with liquid damping fluid, the damping action is determined exclusively by way of dry friction of the contact face 802 on the contact track 88.

In the relieved state, that is to say in the non-mounted state outside the housing 81, the rotor 800 preferably has a slight oversize relative to the internal diameter of the inner circumferential face 84 of the housing 81, that is to say the contact faces 802 project radially somewhat further than the radius r. As a result of the design of the blades 801 with regard to their cross section and the material which is used, for example plastic such as thermoplastic elastomer or the like, they are resiliently flexible in the manner of a leaf spring or a spring leaf. As a result of the arcuate course, the contact faces 802 can be compressed elastically in a radial manner in the direction of the rotor axis R, with the result that the rotor 800 can be introduced axially into the interior 83. In the inserted state, the contact faces 802 are pressed correspondingly with a spring force in the region of the contact track 88 against the inner circumferential face 84.

As has already been explained, in the case of a rotation of the rotor 800, the contact faces 802 move rubbingly along the contact track 88 of the inner circumferential face 84, the frictional force which occurs between the contact faces 802 and the circumferential face 84 braking the rotational movement of the rotor 800, in other words damping the rotor 800. The magnitude of the effective frictional force which acts here is first of all dependent, in a statistical observation, on the relative surface pressure which is dependent on the above-described spring force which is exerted by the elastic blades 801 on the contact faces 802.

In the case of the configuration according to the invention of the rotor 800, there is additionally also a dynamic frictional force: in the case of a rotation in the rotational direction D, a frictional force $F_{reib}$ acts on each contact face 802 in the opposite circumferential direction, as can be seen from the illustrated force vector. As a result of the angled-away attachment of the contact face 802, part of the frictional force $F_{reib}$ is converted by the blade 8 into a radial force component $F_{radial}$ which additionally presses the contact face 802 against the contact track 88 of the circumferential face 84 in the radial direction. As a consequence, the effective friction between the rotor 800 and the housing 81 is increased in the case of a rotation of the rotor 800 in the rotational direction D, which correspondingly leads to a braking action which is increased in a manner dependent on the speed and therefore to more pronounced damping.

In the case of a rotation in the reverse rotational direction (-D) counter to the rotational direction D, the above-described dynamic boosting of the frictional force does not occur. The frictional forces which occur in the opposite direction even result in a relief of the contact face 802, that is to say the contact faces 802 slide more easily over the contact track 88, with the result that freewheeling in the reverse rotational direction is realized in practice.

Figure 9:
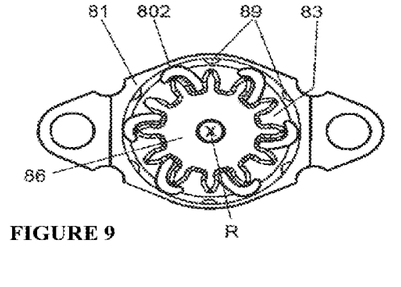
FIG. 9 is a front view of another example rotational damper.

A second embodiment of a rotational damper 8 according to the invention is shown in FIG. 9 in the same view as in FIG. 7. Here, in order to boost the braking action, projections 89 which project radially inward and are rounded in the manner of hills are arranged on the inner circumferential face 84 in the region of the contact track 88. In the case of a rotation, the contact faces 802 slide over the slotted guide face which is formed in this way, and have to overcome the projections 89. The braking moment or the damping action is boosted as a result.

Figure 10:
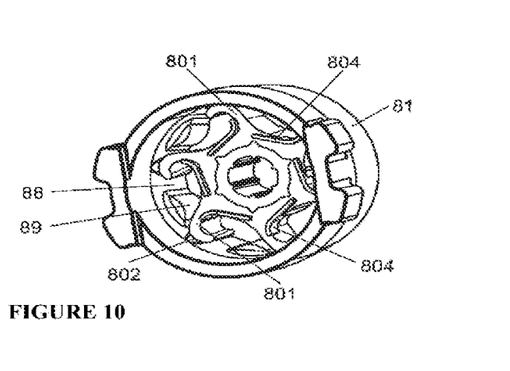
FIG. 10 is a perspective view of the rotational damper of FIG. 9.
Figure 11:
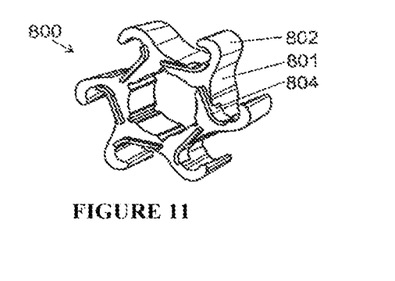
FIG. 11 is a perspective view of the rotor of FIG. 10.

It can be gathered from the illustration in FIGS. 10 and 11 that additional spring elements 804 are attached on an end side of the rotor 800 in the form of rib-like projections which at least in sections follow the angled-away shape of the blades 801. By means of said additional spring elements 804, the elasticity of the blades 801 can be defined and therefore the spring force, with which the contact faces 802 are pressed against the contact track 88, can optionally be boosted.

Figure 12:
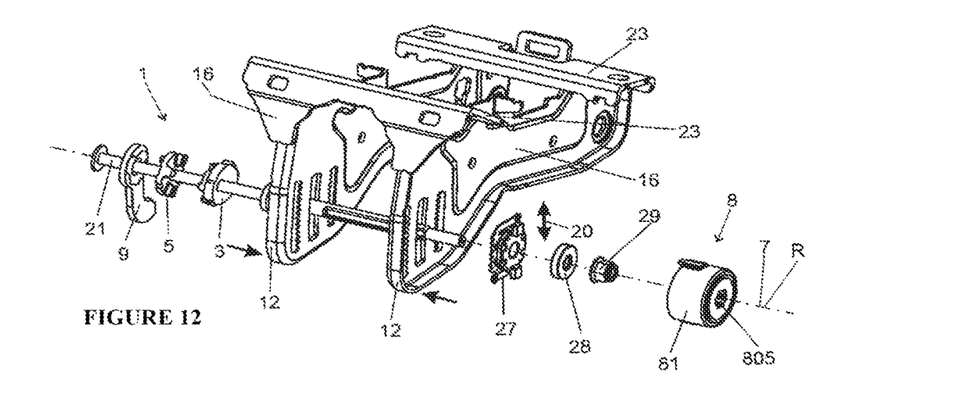
FIG. 12 is an exploded perspective view of an example clamping device with another example rotational damper.
Figure 13:
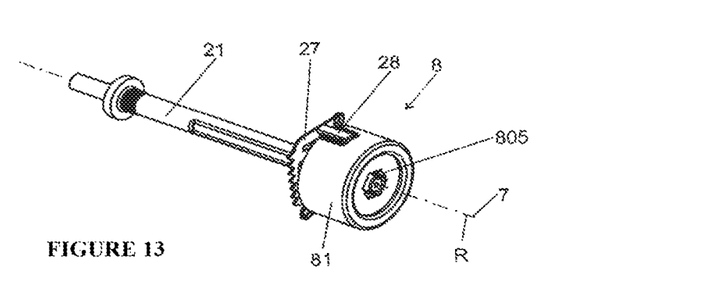
FIG. 13 is a perspective view of the rotational damper of FIG. 13.

FIGS. 12 and 13 diagrammatically indicate an alternative embodiment of a locking device 1 according to the invention. Here, the actuating shaft 21 is arranged in a manner known per se with the actuating lever 9 which is attached fixedly so as to rotate with it and the cam carriers 3 and 5, the function of which has already been described above in detail. The actuating shaft 21 is guided through the two opposite side cheeks 12. On the opposite side, on the side cheek 12 which faces the observer in the drawing, the actuating shaft 21 is mounted in a bearing unit 27 which can be fixed at different heights on the side cheek 12 for vertical adjustment in the vertical adjustment direction 20, and is secured in the axial direction of the rotational axis 7 with a sliding ring 28 being positioned in between, by means of a fastening element 29, preferably a hexagon nut with an internal thread 29.

According to the invention, a rotational damper 8 is coupled to the actuating shaft 21. Here, unlike in the first example which was shown, the housing 81 is fastened fixedly on the bearing unit 27 so as to rotate with it by means of fastening elements 28, which bearing unit 27 for its part can be fastened fixedly on the side cheek 12 of the bracket part 16 so as to rotate with it. The fastening element (nut) 29 is connected in a torque-transmitting manner to the rotor 800 which is arranged in the interior of the housing 81 and is arranged coaxially with respect to the actuating shaft 21, that is to say its rotor axis R is identical to the rotational axis 7. The torque-transmitting connection can be effected, for example, by the fastening element being configured as a hexagon nut which engages into a corresponding hexagon socket opening 805 in the rotor 800 in a positively locking manner.

In principle, the function with regard to the damping action is identical to the embodiment which is described above, the coupling of the rotor 800 to the actuating shaft 21 not taking place via gearwheels 10 and 86 which are connected in between, in contrast to said above-described embodiment, but rather by way of direct fastening to the actuating shaft 21.

If applicable, all individual features which are shown in the individual exemplary embodiments can be combined with one another and/or exchanged for one another, without departing from the scope of the invention.

LIST OF DESIGNATIONS

1 Locking device
2 Steering column
3 First cam carrier
4 Cam
5 Second cam carrier
6 Cam
7 Rotational axis
8 Rotational damper
9 Actuating lever
10 First gearwheel
11 Toothing system
12 Side cheek
13 Casing unit
14 Longitudinal axis
15 Steering spindle
16 Bracket part
19 Longitudinal adjustment direction
20 Vertical adjustment direction
21 Actuating shaft
23 Fastening lugs
24 Steering wheel connector
25 Box section swingarm
26 Pivoting joint
27 Bearing unit
28 Fastening element
29 Fastening element
81 Housing
82 Fastening lugs
83 Interior
84 Inner circumferential face
85 Axle journal
86 Second gearwheel
87 Cover
88 Contact track
89 Projection
800 Rotor
801 Blade
802 Contact face
803 End region
804 Spring element
805 Hexagonal socket opening

What is claimed is:

1. A locking device for an adjustable steering column for a motor vehicle comprising:
   an actuating shaft that is mounted so as to be rotatable about a rotational axis;
   an operative element of a clamping device, wherein the actuating shaft is connected to the operative element; and
   a rotor of a dry rotational damper, with the actuating shaft being coupled to the rotor, wherein the rotor is mounted rotatably in a housing and is configured to be driven rotationally about a rotor axis by the actuating shaft, wherein the rotor comprises a blade that projects radially with respect to the rotor axis and that has a contact face that makes frictional contact with a contact track on an inner face of the housing, wherein a rotational movement of the rotor is damped in a rotational direction, wherein a damping action is based on dry friction of the contact face on the contact track.

2. The locking device of claim 1 wherein the inner face of the housing on which the contact track is disposed is an inner circumferential face that surrounds the rotor and has a substantially cylindrical shape that is coaxial with respect to the rotor axis.

3. The locking device of claim 1 wherein the inner face of the housing on which the contact track is disposed is an inner circumferential face that surrounds the rotor and has a conical shape that is coaxial with respect to the rotor axis.

4. The locking device of claim 1 wherein the blade comprises a spring element that prestresses the contact face against the contact track.

5. The locking device of claim 4 wherein the blade is configured as a leaf spring in a region between the rotor axis and the contact face, wherein the leaf spring extends at least in sections in an inclined manner in a first circumferential direction relative to a radial direction.

6. The locking device of claim 1 wherein a cross section of the contact face has an arcuate configuration, wherein an arc that corresponds to the arcuate configuration is open towards the rotor axis and has a bending radius that is smaller than a bending radius of the contact track.

7. The locking device of claim 1 further comprising structural elements disposed on the contact track.

8. The locking device of claim 7 wherein the structural elements are projections.

9. The locking device of claim 1 wherein the rotor is attached fixedly on the actuating shaft such that the rotor rotates with the actuating shaft.

10. The locking device of claim 1 further comprising:
a first gearwheel; and
a second gearwheel attached fixedly on the rotor such that the second gearwheel rotates with the rotor, wherein the second gearwheel is engaged with the first gearwheel, wherein the second gearwheel is drivable rotatably relative to the first gearwheel by the actuating shaft.

11. The locking device of claim 1 wherein at least one of the rotor, the housing, the first gearwheel, or the second gearwheel is a plastic injection-molded part.

12. The locking device of claim 1 wherein at least one of the rotor or the housing is a plastic injection-molded part.

* * * * *

UNITED STATES PATENT AND TRADEMARK OFFICE
CERTIFICATE OF CORRECTION

PATENT NO. : 10,293,846 B2
APPLICATION NO. : 15/554030
DATED : May 21, 2019
INVENTOR(S) : Martin Prawda and Daniel Shearer Page 1 of 1

It is certified that error appears in the above-identified patent and that said Letters Patent is hereby corrected as shown below:

On the Title Page

"Applicants" now reads:
THYSSENKRUPP PRESTA AG, Eschen (DE); thyssenkrupp AG, Essen (DE).
Should read:
THYSSENKRUPP PRESTA AG, Eschen (LI); thyssenkrupp AG, Essen (DE).

"Assignees" now reads:
THYSSENKRUPP PRESTA AG, Eschen (DE); thyssenkrupp AG, Essen (DE).
Should read:
THYSSENKRUPP PRESTA AG, Eschen (LI); thyssenkrupp AG, Essen (DE).

Signed and Sealed this
Twenty-third Day of July, 2019

Andrei Iancu
*Director of the United States Patent and Trademark Office*